United States Patent [19]
Kane

[11] Patent Number: 5,487,100
[45] Date of Patent: Jan. 23, 1996

[54] ELECTRONIC MAIL MESSAGE DELIVERY SYSTEM

[75] Inventor: John R. Kane, Wellington, Fla.

[73] Assignee: Motorola, Inc., Schaumburg, Ill.

[21] Appl. No.: 248,853

[22] Filed: May 17, 1994

Related U.S. Application Data

[63] Continuation of Ser. No. 954,179, Sep. 30, 1992, abandoned.

[51] Int. Cl.$^6$ .................................................. H04M 11/00
[52] U.S. Cl. ...................... 379/57; 379/96; 340/825.44; 340/825.07; 340/825.15; 340/825.17; 340/311.1
[58] Field of Search .................................. 379/57, 56, 96, 379/88, 89; 340/825.44, 311.1, 825.07, 825.15, 825.17, 825.27, 825.26

[56] References Cited

U.S. PATENT DOCUMENTS

| | | | |
|---|---|---|---|
| 4,644,351 | 2/1987 | Zabarsky et al. | 340/825.44 |
| 4,713,780 | 12/1987 | Schultz et al. | |
| 4,766,434 | 8/1988 | Matai et al. | 340/825.44 |
| 4,928,096 | 5/1990 | Leonardo et al. | 340/825.44 |
| 4,940,963 | 7/1990 | Gutman et al. | 340/825.44 |
| 4,941,170 | 7/1990 | Herbst . | |
| 4,994,985 | 2/1991 | Cree et al. | |
| 5,040,141 | 8/1991 | Yazima et al. | |
| 5,043,721 | 8/1991 | May | 340/311.1 |
| 5,072,444 | 12/1991 | Breeden et al. | 370/94.1 |
| 5,093,918 | 3/1992 | Heyen et al. | |
| 5,274,699 | 12/1993 | Ranz | 379/58 |

OTHER PUBLICATIONS

"The New Age of Wireless" by David Hayden, *Mobile Office* May 1992, p. 36.
"EMBARC$^{SM}$ Advanced Messaging by Motorola", RC-5-60, Motorola Inc., Sept. 1992.

Primary Examiner—Curtis Duntz
Assistant Examiner—Stella L. Woo
Attorney, Agent, or Firm—Kelly A. Gardner; John H. Moore

[57] ABSTRACT

An electronic mail message delivery system (100) includes an electronic mail network (113) for delivering electronic mail messages from originating devices to destination devices, the electronic mail messages including network addresses (212) for identifying originating and destination devices communicating the electronic mail messages, and including message data (214). A paging terminal (102) is coupled to the electronic mail network (113) for receiving the electronic mail messages, storing the received electronic mail messages including alias identification (208,210) of the originating devices of the electronic mail messages, and encoding messages including the message data and the alias of the received electronic mail messages for transmission to at least one selective call receiver (130). A paging transmitting means (124,126) transmits the encoded messages over a paging communication channel, and at least one portable selective call receiver (130) can receive the transmitted messages. Optionally, the at least one portable selective call receiver (130) can transmit a reply message through the paging terminal (102) to an originating device on the electronic mail network (113).

12 Claims, 4 Drawing Sheets

ELECTRONIC MAIL MESSAGE DELIVERY SYSTEM

This is a continuation, of application Ser. No. 08/954,179 filed on Sep. 30, 1992 by John Richard Kane for "Electronic Mail Message Delivery System", now abandoned.

FIELD OF THE INVENTION

This invention relates generally to message communication systems, such as for electronic mail systems, and more specifically to an improved X.400 electronic mail communication system for delivering messages between X.400 terminal devices and portable selective call receivers.

BACKGROUND OF THE INVENTION

Communication systems, such as paging systems, typically communicate messages from an originating device to one or more destination devices. These messages can include numeric and alphanumeric information for a user of the destination device, the destination device, e.g., a selective call receiver or pager, typically presents the information received to the user by displaying the information on the display.

Normally, the paging system delivers messages to the one or more selective call receivers over a paging communication channel. This paging communication channel typically has limited bandwidth allowing only a limited amount of information to be transmitted over the paging communication channel within a specified time interval. Hence, for efficient use of the paging communication channel resource it is desirable to keep messages as short as possible.

In today's active and mobile life style, there is a distinct trend in the marketplace resulting from a customer desire for reception much longer messages while on the go. Also, electronic mail delivery systems have significantly evolved in the last few years with the development of the international standard of CCITT X.400 Standard Electronic Mail Delivery System. The X.400 electronic mail standard allows different communication systems to interface with each other while delivering electronic mail to users.

Regrettably, the CCITT X.400 standard places requirements not only on the originating device but also on the destination device, e.g., the electronic mail receiving device. Specifically, the standard electronic mail message packets typically require extensive header information which is unsuitable for transmission over a paging communication channel of limited bandwidth. Further, the electronic mail standard requires that the destination device be capable of replying back to the originating device through the X.400 interface, and including the extensive header information and path information required to find the destination of the reply messages. Additionally, the electronic mail standard requires that a message either be delivered to the destination device or returned to the originating device with a notification that the message was not delivered. Therefore, there is a need in the marketplace for providing longer messages, such as available in the CCITT X.400 electronic mail standard, to portable selective call receivers while overcoming the aforementioned communication system constraints.

SUMMARY OF THE INVENTION

According to a first aspect of the present invention, an electronic mail delivery system comprises an electronic mail network for delivering a first message from an originating device to a destination device. The first message includes message data and a network address for identifying the originating and destination devices, and the network address comprises a first number of characters. A paging terminal coupled to the electronic mail network receives the first message and automatically generates from the network address therein an alias of the originating device having a second number of characters less than the first number of characters without user intervention further than that required for initiation of the first message. The paging terminal further encodes the message data and the alias, rather than the network address, into a second message for transmission to at least one selective call receiver.

Paging transmitting circuitry transmits the second message over a paging communication channel. At least one portable selective call receiver receives the second message over the paging communication channel and presents at least the message data of the second message to a user of the at least one portable selective call receiver.

According to another aspect of the present invention, a method, in a communication system, for processing electronic mail messages includes the step of an electronic mail network forwarding a first message from an originating device. The first message includes message data and a network address for identifying the originating device and a destination selective call receiver. The network address comprises a first number of characters. The method further includes the step of a paging terminal receiving the first message and automatically generating from the network address an alias of the originating device having a second number of characters less than the first number of characters without user intervention further than that required for initiation of the first message. The paging terminal encodes the alias, rather than the network address, and the message data into a second message. The paging terminal further transmits the second message over a paging channel. The destination selective call receiver receives the second message transmitted over the paging channel.

DESCRIPTION OF A PREFERRED EMBODIMENT

Figure 1:
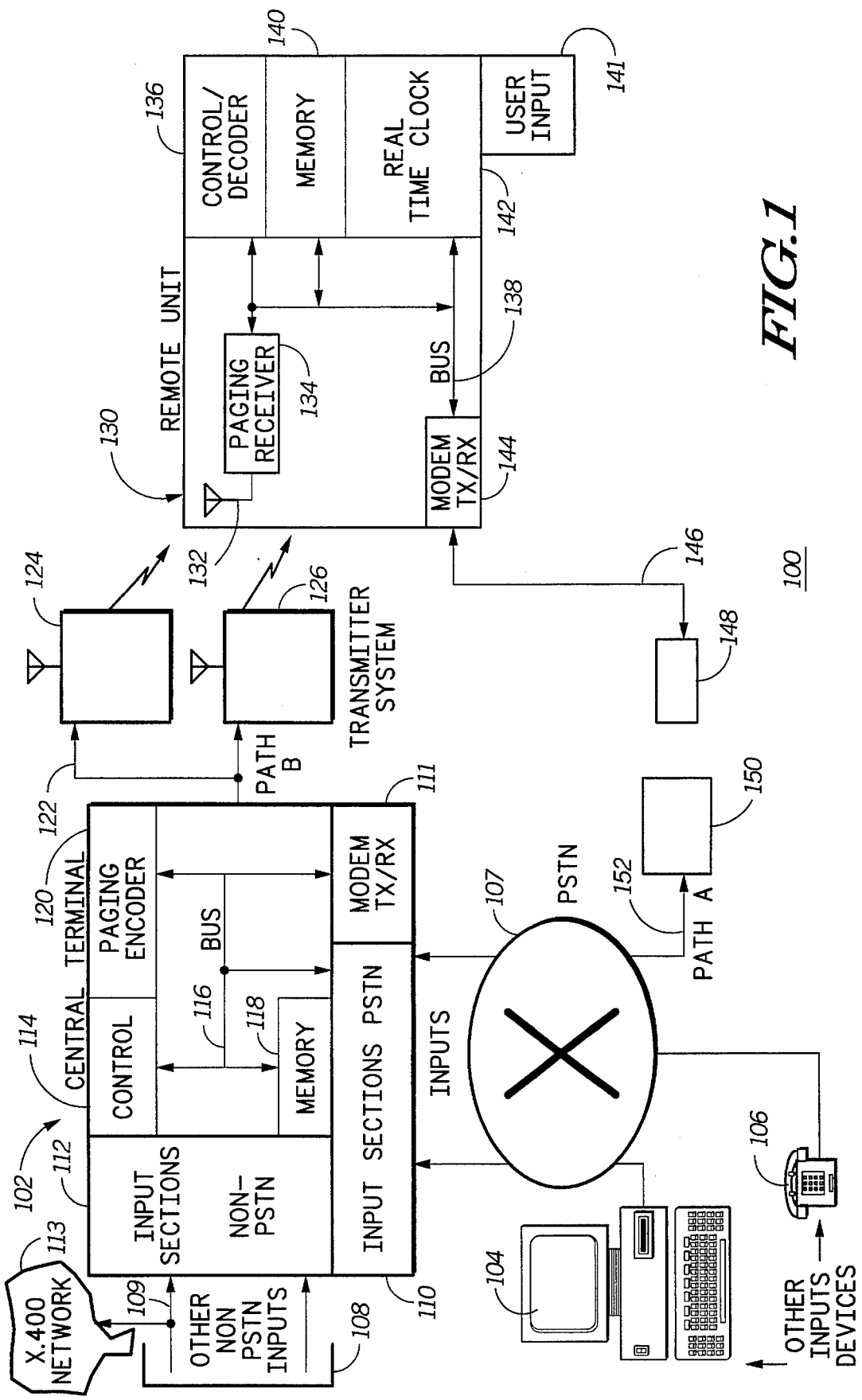
FIG. 1 is a block diagram of a communication system in accordance with the preferred embodiment of the present invention.

FIG. 1 shows a communication system 100 utilizing a paging transmitter system 120, 122, 124, 126, for delivering messages to at least one portable remote unit, e.g., a portable selective call receiver 130, in accordance with the preferred embodiment of the present invention. A central terminal 102 comprises input sections 110, 112 for receiving inputs from a number of different devices 104, 106, 108, including receiving page requests for initiating pages that are transmitted by the paging transmitter system 120, 122, 124, 126, to the at least one portable remote unit 130. The central terminal 102 has input sections 110 that interface with the telephone company equipment, such as the public switched telephone network (PSTN) 107. Personal computers or other computing devices 104 can access the input sections 110 through the PSTN using a dial-up telephone line and modem communication. Other calling devices, such as telephone input devices 106 can access the input sections 110 of the central terminal 102 through the PSTN. Typically, these input devices 104, 106, can remotely initiate page requests through the central terminal 102 by calling up the input sections 110 of the central terminal 102 over dial-up telephone lines of the PSTN 107.

Alternatively, other input sections 112 of the central terminal 102 can receive inputs, such as page requests, from local computing interfaces 108, such as for interfacing with a local personal computer, a console, or other terminal device. Also, an interface 109 to an X.400 network 113, e.g., an X.400 gateway, can handle message delivery between the input sections 112 of the central terminal 102 and one or more originating devices on the X.400 network 113. Typically, the one or more local computing interfaces 108 couple with the input sections 112 of the central terminal 102 via direct wire line connections using standard RS-232, RS-422 interface, or other known interface technology.

The input sections 110, 112, communicate page requests to a controller 114 through a communication bus 116. The controller 114 may comprise controller circuitry and associated memory such that an incoming page request may be accepted and stored into available memory for subsequent transmission to one or more selective call receivers 130.

A non-volatile memory device 118, such as battery backed up RAM, one or more disc drive units, or other non-volatile storage medium, is utilized by the controller 114 for longer term storage of messages destined for the one or more selective call receivers 130. The controller 114 typically couples the message information and other associated information to the memory device 118 via the bus 116. The message information, which can include numeric, alphanumeric, or binary information, and other associated information, is stored in the memory 118 and can be used by the controller 114 for keeping track of the messages being delivered to the remote units 130. The message information can also be used by the controller 114 to provide a means through the central terminal 102 for delivering reply messages from the remote units 130 back to one or more X.400 originating devices on the X.400 network 113, as will be more fully discussed below.

Additionally, a timing module 128 provides time information to the controller 114. The time information, e.g., date and time of day information, can be utilized for keeping track of messages being processed by the central terminal 102, for communicating time information along with the delivered messages to the selective call receivers 130, and for other system administrative and maintenance functions for the central terminal 102. This time information can also be used to facilitate X.400 message addressing and delivery between the X.400 network 113 and the remote units 130, as will be more fully discussed below.

The controller 114 couples messages to the paging encoder 120 over the bus 116 for encoding the messages for transmission over a paging channel. The paging encoder 120 then couples the encoded messages over a communication path 122 to one or more paging transmitter systems 124, 126, for transmission over a paging communication channel. The communication path 122, in this example, routes the messages from the central terminal 102 to a paging transmitter system 124, 126, and over a paging communication channel for reception by the one or more selective call receivers 130. The general operation of a communication system including a paging system of the general type shown in FIG. 1 is more fully described in U.S. Pat. No. 5,138,311, issued Aug. 11, 1992, entitled, "Communication System Having Adaptable Message Information Formats" which is assigned to the same assignee as the present invention and is incorporated herein by reference.

The selective call receiver 130 preferably incorporates a paging receiver 134 that operates to receive messages transmitted over the paging communication channel through the antenna 132. The general operation of a paging receiver 134 of the general type shown in FIG. 1 is well known and is more fully described in U.S. Pat. No. 4,518,961 issued May 21, 1985, entitled, "Universal Paging Device With Power Conservation", which is assigned to the same assignee as the present invention and is incorporated herein by reference.

The paging receiver 134 couples a received message to the controller 136 through the bus 138. The controller 136 operates to decode the received message and match address information in the received message to a predetermined address in the selective call receiver 130. In this way, the controller 136 can determine whether the received message is intended for the particular selective call receiver 130. Further, a memory 140 is coupled to the paging receiver 134 and the controller 136 through the bus 138 for storing the received message in the memory 140. A user can access user input means 141, such as buttons or switches, at the remote unit 130 to cause the message data of a received message to be displayed on a display, e.g., a liquid crystal display (not shown). The user can then read the message that is visible on the display. User input at the remote unit 130 can also cause the remote unit 130 to perform other functions known to users of selective call receivers and portable personal computing devices.

A real time clock 142 is also coupled through the bus 138 to the controller 136 for providing time information thereto. The remote unit 130 is then capable of providing time information to the user as part of displaying information on the display (not shown). Additionally, the controller 136 can utilize the time information provided by the real time clock 142 for other useful operations in the selective call receiver 130.

Furthermore, the selective call receiver 130 includes a modem transmitting unit and a modem receiving unit 144 and the associated telephone interfacing circuitry or other suitable communications apparatus (e.g. packet radio modem) which, for example, allows the user of the selective call receiver 130 to connect the selective call receiver 130 to a telephone interface 150, such as may be provided by an RJ11 plug 148 and associated wiring 146 at the selective call receiver 130 and the complementary wall jack 150 and associated wiring 152 thereof. This telephone interface 144, 146, 148, 150, 152, allows the controller 136 of the selective call receiver 130 to remotely access the central terminal 102 through a dial-up telephone line and the PSTN 107. At the central terminal 102, a modem transmitting unit and a modem receiving unit 111 is capable of communicating with the modem 144 at the selective call receiver 130. In this way, the selective call receiver 130 can communicate with the central terminal 102 and optionally deliver reply messages therethrough into the X.400 network 113 for one or more X.400 terminal devices. Therefore, the selective call receiver 130 can receive messages from the central terminal 102 via the first path 122 comprising the paging communication channel, and can transmit reply messages through the central terminal 102 and into the X.400 network via the second path 152. The first path 122 communication medium is preferably a paging communication channel and the second path 122 communication medium preferably comprises a dial up telephone line interface 152 and the PSTN 107.

An advantage of delivering messages to the remote units 130 through the paging communication channel is that typically a large number of medium to smaller sized messages can be delivered through the paging communication channel while servicing a large subscriber population. Also, the selective call receivers 130 are normally portable devices making the subscriber population relatively mobile while maintaining constant communication by receiving transmitted messages over the paging communication channel. These significant advantages enhance the commercial viability of the communication system 100. Additionally, while providing the stated advantages, the central terminal 102 can deliver X.400 messages from X.400 originating devices in the X.400 network 113 to the remote units 130 over the paging communication channel 122. This and other aspects of the communication system 100 are discussed below.

Figure 2:
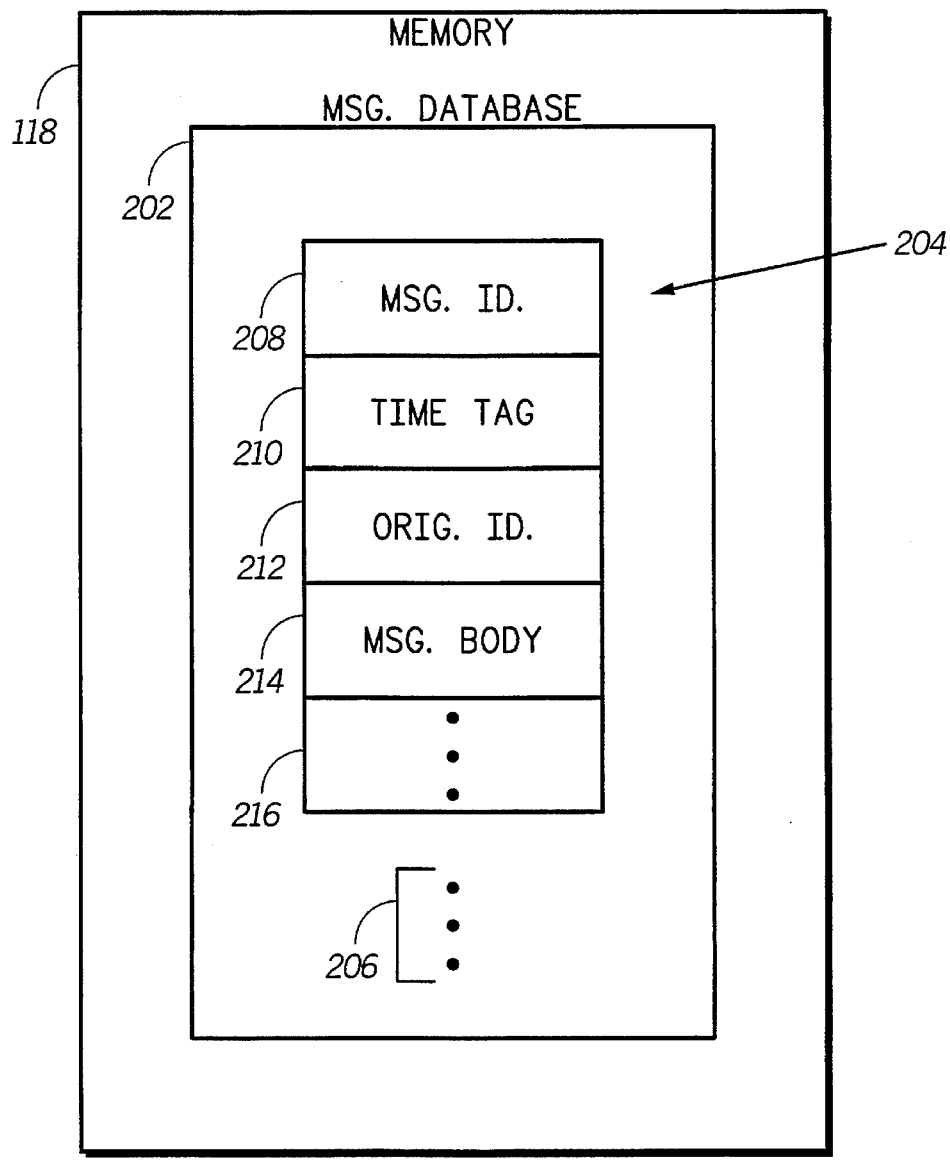
FIG. 2 is a memory block diagram illustrating a message data base organization according to the preferred embodiment of the present invention.

FIG. 2 shows a message database 202 in the central terminal memory 118 for keeping track of X.400 electronic mail messages delivered through the central terminal 102 and for allowing reply messages from the remote units 130 through the central terminal 102 and back to the originating device through the X.400 network 113. The message database 202 is maintained for each subscriber identified by a subscriber address in the communication system 100. The subscriber address is typically located in a subscriber database (not shown) in the terminal memory 118 for sending messages to the remote units 130. On the other hand, the message database 202 allows the central terminal 102 to keep track of the X.400 messages being sent to the remote units 130 while allowing the central terminal 102 to service reply message requests from the remote units and destined for the originating device in the X.400 network 113.

When the controller 114 determines that an X.400 message is requested to be sent to one or more remote units 130 from an X.400 originating device, the controller 114 stores a copy of the X.400 message intact in the central terminal memory 118. A message record 204 is stored in the message database 202 including a message I.D. field 208 and a time tag field 210 for identifying the message record 204 in the message database 202. The X.400 message information, such as the originator's I.D. 212, the message body 214, and other associated X.400 information 216 are also stored in the message record 204 in the message database 202. Similarly, as other messages are received by the central 102 additional message records 206 are created in the message database 202 for keeping track of those messages being processed through the communication system 100.

Preferably, the message I.D. 208 is a short string of characters, which can identify the originator of the X.400 message from the X.400 network 113. For example, the message I.D. 208 can comprise the surname (SN) information from the X.400 message which identifies the originating device of the X.400 message. Further, the controller 114 accesses the timing module 128 to get timing information which the controller 114 then adds to the message record 204 as part of a time tag field 210. The combination of the message I.D. 208 and the time tag 210 identify the originator of the message and the specific occurrence of the message, e.g., the time of occurrence, through the central terminal 102. Hence, if multiple messages originate from the same originating device, they are distinguishable from each other due to the time tag field 210. In this way, the central terminal 102 can keep track of the X.400 messages that it services. Additionally, the central terminal 102 sends along with the transmitted message the message I.D. information 208, and the time tag information 210 for identifying the message to the destination remote unit 130. The message I.D. information 208 and the time tag information 210 require typically about 20 characters to be transmitted with the message over the paging communication channel. This is much more efficient than transmitting the original X.400 address information which can require upwards of 400 characters to identify the X.400 address for the X.400 network 113. Therefore the paging communication channel bandwidth is more efficiently utilized by the communication system 100 in delivering the electronic mail messages to the remote units 130.

Figure 3:
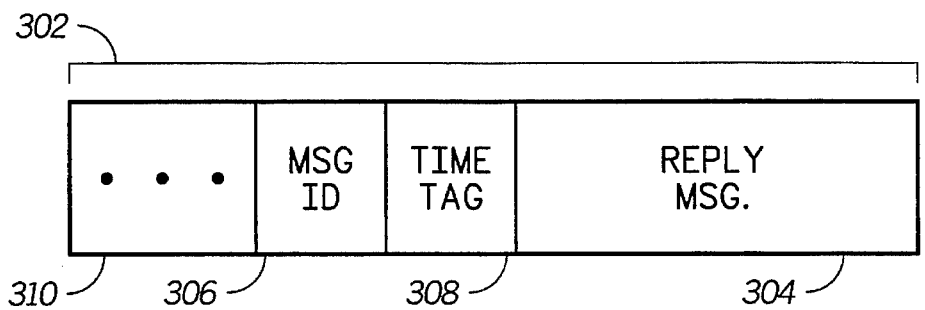
FIG. 3 is a message block diagram illustrating a reply message for the communication system of FIG. 1, according to the preferred embodiment of the present invention.

As shown in FIG. 3, the remote units 130 can send a reply message 302 through the central terminal 102 back to the X.400 originating device in the X.400 network 113. The remote unit 130 can access the central terminal 102 such as through the public switch telephone network 107 using modem communication over a dial-up telephone line 152. A modem 144 at the remote unit 130 can communicate with a modem 111 at the central terminal 102. The remote unit 130 can be connected to a standard RJ11 wall outlet 150 through a complementary plug 148 and associated wiring 146 at the remote unit 130. Hence, the remote unit 130 can couple a reply message 302 back to the central terminal 102 for delivery to the X.400 originating device in the X.400 network 113. Among other information 310 in the reply message 302, the message I.D. information 306 and the time tag information 308 are included to identify the message record 204 (FIG. 2) in the message database 202. Of course, reply message information 304 is also included in the reply message 302.

The controller 114 can use the message I.D. 306 and the time tag 308 from the reply message 302 to do a look-up in the message database 202 for the original message record 204. The controller 114 can then create an X.400 message including the reply message information 304 and the X.400 originator identification 212 for sending the reply message information 304 through the X.400 network 113 to the originating device. Once the controller 114 has created the X.400 message including the reply message information 304, it can couple the X.400 message through the non PSTN input section 112 and interface 109 into the X.400 network 113. Hence, the central terminal 102 can send the X.400 message into the X.400 network 113 for destination back to the originating device. In this way, the remote unit 130 can send a reply message 302 to the originating device in the X.400 network 113.

Figure 4:
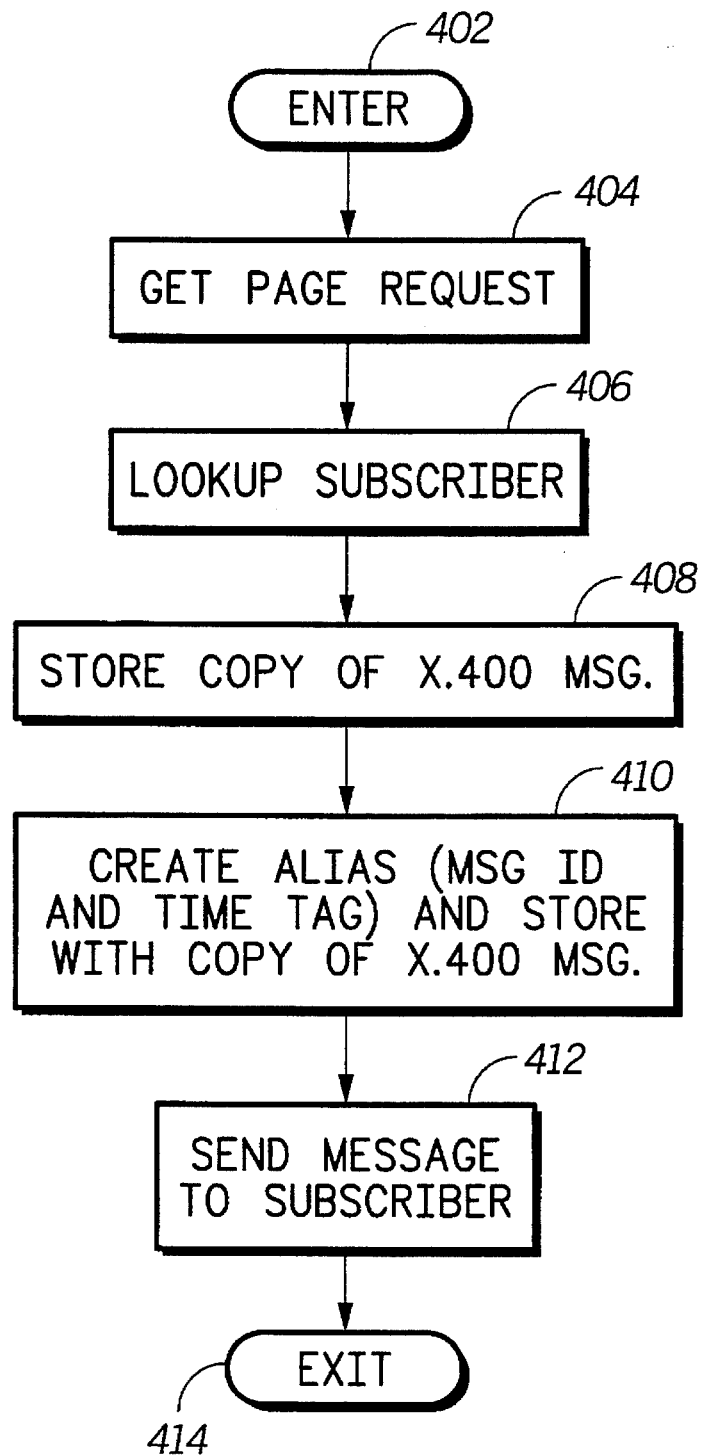
FIGS. 4 and 5 are flow diagrams illustrating operational sequences for the central terminal of FIG. 1, in accordance with the preferred embodiment of the present invention.

FIG. 4 shows a flow diagram of an operational sequence for the controller 114 for delivering a message from the X.400 network 113 to one or more remote units 130 according to the preferred embodiment of the present invention. Once the controller 114 gets a page request 402, 404, from the non PSTN input sections 112 from the X.400 network interface 109, the controller 114 performs a look-up 406 in the subscriber database to verify a subscriber record identified in the X.400 message as the destination of the message. Typically, the X.400 message will identify an X.400 destination address which the controller 114 converts to a selective call receiver address through the subscriber database look-up. The selective call receiver address uniquely identifies the remote unit 130 in the communication system 100. It is also much shorter in length than the number of characters required to identify an X.400 address information. Hence, it is much more efficient for transmission over the paging communication channel. After the controller 114 performs a look-up 406 in the subscriber database (not shown), the controller 114 then stores 408 a copy of the X.400 message in a new record 204 in the message database 202 in memory 118. Then, the controller 114 creates an alias 410 for the originator X.400 address and stores the alias information with the copy of the X.400 message in the message record 204 in the message database 202. The alias information comprises the message identifier 208 and the time tag information 210, as discussed earlier. Subsequently, the controller 114 can send 412 the message to the subscribing remote unit 130 as discussed earlier. The message also includes the originator alias, e.g., including the message identifier information 208 and the time tag information 210, for identifying the X.400 originating device for possibly sending a reply thereto. After sending 412, 414, the message to the subscriber remote unit 130 the controller 114 can go perform other functions for the central terminal 102.

Figure 5:
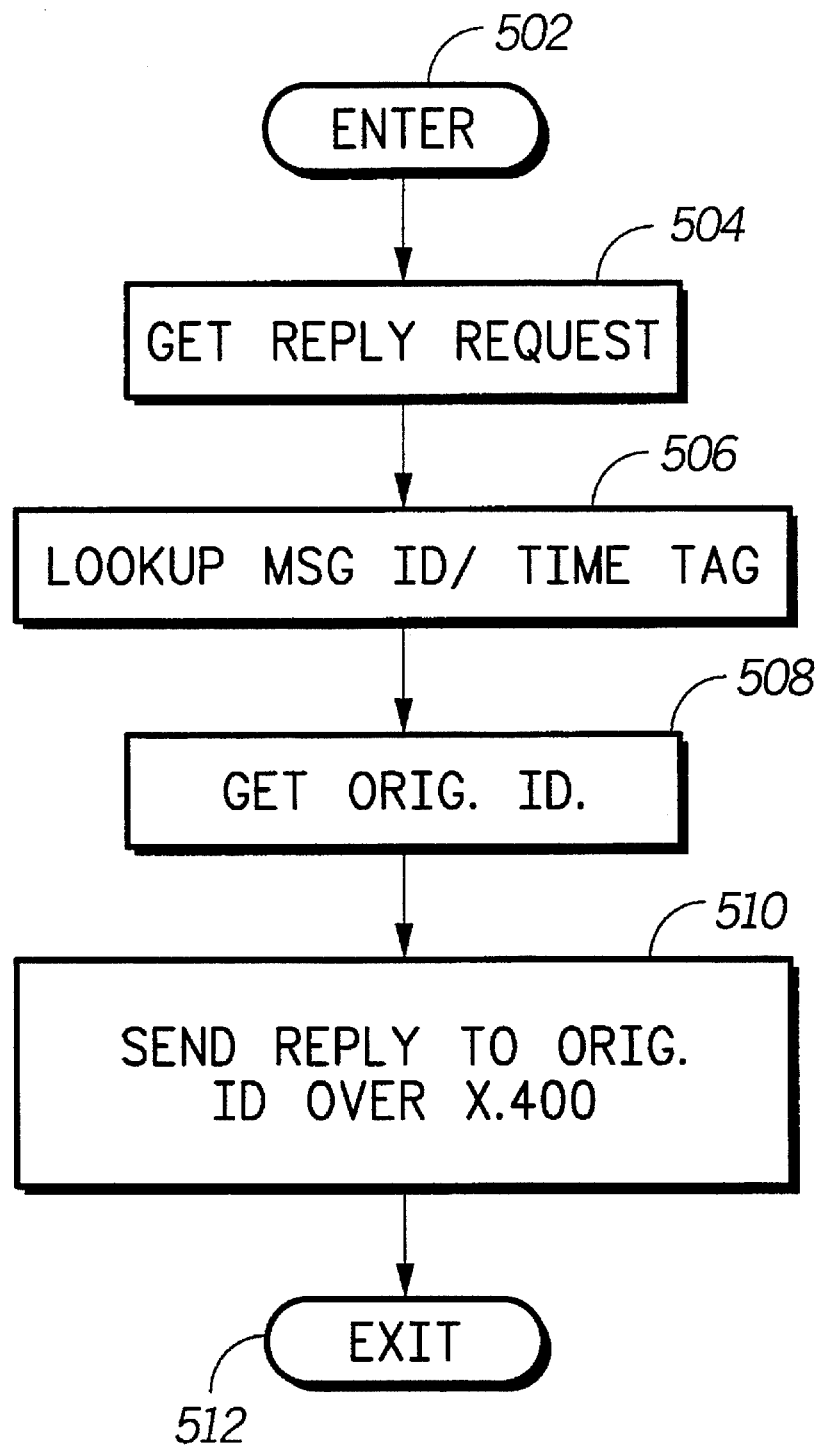

FIG. 5 shows a flow diagram illustrating an operational sequence at the controller 114 for processing a reply message from the remote unit 130 to an X.400 originating device. Once the central terminal 102 gets the reply message request 302 from the remote device 130, the controller 114 extracts the message identifier 306 and time tag information 308 from the reply message 302 and performs a look-up 506 in the message database 202 for the particular message record 204. The controller 114 then gets 508 the X.400 originator identification information from the message record 204 and prepares an X.400 message including the reply message information 304 for sending to the X.400 originating device. Subsequently, the controller 114 can send 510 the X.400 reply to the originating device over the X.400 interface 109 to the X.400 network 113 as discussed earlier. After sending the reply 510, the controller 114 can go 512 perform other functions for the central terminal 102. In this way, the remote unit 130 can send a reply message through the central terminal 102 to an X.400 originating device in the X.400 network 113.

Therefore, as discussed above, the communication system 100 can effectively deliver electronic mail messages, such as X.400 electronic mail messages, to one or more portable selective call receivers 130. Further, each of the remote units 130 can send reply messages through the central terminal 102 back to the X.400 originating device. By utilizing the alias information, such as the message identifier and time tag information, the communication system 100 efficiently utilizes the limited bandwidth of the paging communication channel, while allowing the remote units 130 to send the reply messages identifying the X.400 originating device. Additionally, the central terminal 102 retains a copy of each X.400 message in a message database 202 and can subsequently utilize the stored information to send a status back to the X.400 originating device, if necessary. That is, for example, the central terminal 102 can notify the X.400 originating device that the X.400 message was successfully delivered to the remote unit 130 or that it was not delivered. Hence, the central terminal 102 can also utilize the information stored in the message database 202 to communicate back with the X.400 originating device over the X.400 network 113.

One further aspects of the communication system 100 provides subscribers with the ability to determine a maximum message length to be received over the paging communication channel. This effectively conserves bandwidth of the paging communication channel by limiting the size of messages being transmitted, while it also helps subscribers limit their overall cost of receiving messages through the communication system 100 because subscribers can be incrementally tariffed based on the length of their messages transmitted over the paging communication channel. Preferably, each subscriber can set a parameter in their subscriber record in the subscriber database in the memory 118. The parameter sets the maximum number of message characters that can be transmitted to the subscriber in any single message transmitted over the paging communication channel. This threshold parameter value is verified by the controller 114 with every message for transmission over the paging communication channel. If the number of message characters exceeds the threshold then the central terminal 102 may send a truncated message to the selective call receiver 130, or optionally may send a short message identifying the current message is too long for transmission. The subscriber can then access the central terminal 102, such as through the dial-up telephone line 152 and the PSTN 107, to receive the long message. Optionally, a subscriber can receive a truncated message and then decide whether to access the central terminal 102 to receive the full message over the dial-up telephone line 152. In this way, subscribers can better manage their costs of receiving messages.

What is claimed is:

1. An electronic mail delivery system comprising:

an electronic mail network for delivering a first message from an originating device to a destination device, the first message including message data and a network address for identifying the originating and destination devices, the network address comprising a first number of characters;

a paging terminal coupled to the electronic mail network for receiving the first message and automatically generating from the network address therein an alias of the originating device having a second number of characters less than the first number of characters without user intervention further than that required for initiation of the first message, wherein the paging terminal further encodes the message data and the alias, rather than the network address, into a second message for transmission to at least one selective call receiver;

paging transmitting means for transmitting the second message over a paging communication channel; and at least one portable selective call receiver for receiving the second message over the paging communication channel and for presenting at least the message data of the second message to a user of the at least one portable selective call receiver.

2. The electronic mail delivery system of claim 1, wherein the paging terminal comprises a memory for storing the first message, including the network address, and for storing the alias generated from the network address.

3. The electronic mail delivery system of claim 2, wherein the at least one portable selective call receiver includes first modem means for communicating with the paging terminal, and the paging terminal includes second modem means for communicating with the first modem means of the at least one portable selective call receiver, wherein the first modem means transmits a reply message to the paging terminal responsive to the second message received by the at least one portable selective call receiver from the paging terminal, wherein the reply message includes message information and the alias which identifies the first message stored in the memory of the paging terminal, and wherein the paging terminal transmits a third message to the electronic mail network for forwarding to the originating device, the third message including the message information of the reply message and the network address of the originating device.

4. The electronic mail delivery system of claim 3, wherein the paging terminal includes timing means for providing time information for incorporation into the alias as a time tag, and wherein the alias includes a message identifier and a time tag for identifying the location of the first message stored in the memory of the paging terminal.

5. The electronic mail delivery system of claim 3, wherein the memory includes a database for storing electronic mail messages from the electronic mail network including aliases generated therefrom by the paging terminal.

6. The electronic mail delivery system of claim 3, wherein the memory includes a database for storing subscriber information including a maximum message length parameter, and wherein the paging terminal truncates the length of a received message for transmission to a destination selective call receiver over the paging communication channel based on the maximum message length parameter for the destination selective call receiver identified in the database of subscriber information.

7. The electronic mail delivery system of claim 3, wherein the memory includes a database for storing subscriber information including a maximum message length parameter, and wherein the paging terminal, in response to reception of a message having a length greater than that specified by the maximum message length parameter, provides an indication to a destination selective call receiver that the received message is too long for transmission.

8. The electronic mail delivery system of claim 1, wherein the electronic mail network communicates with the paging terminal using CCITT X.400 protocol.

9. The electronic mail delivery system of claim 1, wherein the message data transmitted to the at least one selective call receiver over the paging communication channel comprises binary data.

10. A method, in a communication system, for processing electronic mail messages, the method comprising the steps of:

(a) an electronic mail network forwarding a first message from an originating device, the first message including message data and a network address for identifying the originating device and a destination selective call receiver, the network address comprising a first number of characters;

(b) a paging terminal receiving the first message and automatically generating from the network address an alias of the originating device having a second number of characters less than the first number of characters without user intervention further than that required for initiation of the first message;

(c) the paging terminal encoding the alias, rather than the network address, and the message data into a second message;

(d) the paging terminal transmitting the second message over a paging channel; and (e) the destination selective call receiver receiving the second message transmitted over the paging channel.

11. The method of claim 10, further comprising the steps of:

(f) the paging terminal, subsequent to step (b), storing the message data, the network address, and the alias associated therewith.

12. The method of claim 11, further comprising the steps of:

(g) the destination selective call receiver generating and transmitting a reply message by modem, the reply message including message information and the alias;

(h) the paging terminal receiving the reply message and utilizing the alias transmitted therein to locate the stored network address; and (i) the paging terminal transmitting a third message to the electronic mail network for forwarding to the originating device, the third message comprising the message information included in the reply message and the network address.

* * * * *